United States Patent Office 3,504,053
Patented Mar. 31, 1970

3,504,053
GRAFT COPOLYMERIZATION OF METHYL METHACRYLATE ONTO POLYVINYL CHLORIDE
George D. Williams, Houston, Tex., assignor to Diamond Shamrock Corporation, Cleveland, Ohio, a corporation of Delaware
No Drawing. Filed Oct. 9, 1967, Ser. No. 673,980
Int. Cl. C08f 15/26, 3/30
U.S. Cl. 260—884                               11 Claims

ABSTRACT OF THE DISCLOSURE

A copolymer containing up to 5.5%, by weight, of polymethyl methacrylate grafted onto a PVC backbone polymer exhibits improved processing characteristics by comparison to unmodified PVC homopolymer. This graft copolymer is prepared by contacting the PVC polymer in aqueous suspension with methyl methacrylate monomer in the presence of a free-radical catalyst. The backbone polymer is likewise produced in aqueous suspension, utilizing as catalyst, a combination of lauroyl peroxide and t-butyl peroxypivalate.

BACKGROUND OF THE INVENTION

The present invention relates to a rigid polyvinyl chloride resin composition having excellent processing characteristics. More particularly, it relates to an improved process for producing copolymers comprising polymethyl methacrylate grafted onto polyvinyl chloride.

It is well known that vinyl chloride homopolymer (PVC) is a hard, stiff thermoplastic resin which is difficult to process in unmodified form. It has been common practice in the art, therefore, to improve the processing characteristics of PVC by blending therewith flexibilizing copolymers prepared from other vinyl-type monomers as, for example, copolymers of styrene in combination with one or more other monomers such as butadiene, an alkyl acrylate, an alkyl methacrylate or acrylonitrile. Also, copolymers of alkyl methacrylates and alkyl acrylates have long been known and used as processing aids for PVC.

It is further known that the processing character of PVC can likewise be upgraded by blending therewith graft copolymer materials, i.e., copolymers prepared by grafting one or more monomeric compounds onto an activated polymer backbone. Presently known vinyl chloride graft copolymers have been produced utilizing PVC as the backbone polymer. Conversely, they have also been produced by grafting vinyl chloride monomer onto backbone polymer of at least one other vinyl monomer such as those described above.

Of these graft products, those containing polymethyl methacrylate grafted onto PVC have been prepared heretofore principally in aqueous emulsion, i.e., in an aqueous medium in the presence of an emulsifying agent. However, as disclosed in U.S. Patent No. 2,746,944, the grafting procedure may likewise be conducted in aqueous suspension in the absence of emulsifier. This latter method comprises (1) polymerizing vinyl chloride to substantial conversion in an aqueous medium in the presence of a suspending agent, e.g., gelatin, polyvinyl alcohol or methyl cellulose, and in contact with a peroxide polymerization catalyst as normally used to accelerate vinyl chloride polymerization; (2) removing substantially all of the remaining unreacted vinyl chloride monomer from the reaction mixture; and (3) adding methyl methacrylate monomer to the stripped PVC slurry and continuing the grafting reaction at a fairly low temperature, e.g., from 10° C. to about 40° C. Thus, in this grafting technique, the initial preparation of the PVC backbone polymer and the subsequent grafting reaction are conducted step-wise in a single reactor without removal or separation of the intermediate PVC product. This method is designated in the art as an "in situ" technique. Another process which has been reported as applicable for the grafting of methyl methacrylate onto PVC in aqueous suspension employs polyvinyl chloride which is isolated from the polymerization reaction mixture but is not dried prior to being resuspended in water for the grafting reaction.

Vinyl chloride-methyl methacrylate graft copolymers prepared by the aforementioned, prior art aqueous suspension methods have been found to improve the flowability of PVC when blended therewith. Likewise, these products themselves have exhibited improved processing characteristics by comparison to unmodified PVC. However, finished plastic articles, e.g., pipe, rods, sheets, tubes, etc. fabricated from such copolymers or blends thereof with PVC have exhibited, for the most part, rough, irregular surfaces with a dull or grainy appearance. These products have not been of commercially-acceptable quality.

SUMMARY OF THE INVENTION

It is an object of this invention, therefore, to provide a copolymer of polymethyl methacrylate grafted onto PVC which possesses excellent processing characteristics and which may be used to prepare finished plastic articles of excellent properties and appearance.

It is a further object of this invention to provide an aqueous suspension process for grafting methyl methacrylate onto a PVC backbone polymer whereby the graft copolymer product will possess excellent processing character and will provide high-quality rigid plastic articles by both extrusion and molding operations.

The present invention encompasses a rigid PVC resin composition which contains up to about 5.5 percent, by weight, of polymethyl methacrylate grafted onto the PVC. This modified PVC composition exhibits significantly improved processing characteristics by comparison to unmodified PVC and can tolerate wider variations in processing conditions. It is particularly suitable for the production of rigid pipe, pipe fittings, film and sheeting and may also be used for the fabrication of blow molded containers and other articles by extrusion and molding operations.

The vinyl chloride-methyl methacrylate graft copolymer is prepared in an aqueous suspension system by contacting suspension-polymerized PVC with the methyl methacrylate monomer in the presence of an organic peroxide compound as catalyst to promote the grafting reaction. However, the PVC backbone polymer is prepared employing a specific combination of lauroyl peroxide and t-butyl peroxypivalate as the catalyst, since it has been found that graft copolymers of polymethyl methacrylate on a PVC backbone produced with this specific dual catalyst system consistently and reproducibly exhibit improved melt flow characteristics and provide shaped plastic articles of highest quality. The vinyl chloride-methyl methacrylate graft copolymer of this invention is not produced by the "in situ" process previously described, nor is an undried PVC polymer, i.e., a polymer "wet cake" employed in its preparation. In the grafting reaction herein, the PVC backbone polymer used is a completely isolated and dried product such as commercially available PVC. This resin is resuspended in water prior to being contacted with the methyl methacrylate monomer.

DESCRIPTION OF THE PREFERRED EMBODIMENTS

As used herein in the specification, the term "rigid PVC resin composition" is intended to refer to compositions which are resin powders and wherein the modified PVC resin of this invention is in intimate physical admixture with minor quantities of various modifying ingredients as described hereinafter. In practice herein, these modifying ingredients do not usually include organic liquids which are designated in the art as plasticizers. However, for some specialized applications, the rigid resin composition may contain minor quantities of organic liquid plasticizers, such quantity not exceeding 10%, preferably not exceeding about 5%, based on the weight of the composition. It is to be understood, therefore, that a rigid resin composition which contains up to 10% by weight of an organic liquid plasticizer, although not regularly employed in practice herein, is within the scope of the present invention.

As set forth previously, the consistently improved quality and performance of the vinyl chloride-methyl methacrylate graft copolymer product of this invention by comparison to other similar graft copolymers is due principally to the particular PVC backbone polymer employed in its production. This polymer is prepared herein in an aqueous suspension system as normally practiced in the art for the preparation of vinyl chloride polymers in the form of porous, free-flowing particles.

In general practice in the art, aqueous suspension polymerization processes are effected via a free-radical catalyst mechanism. Suspending agents or protective colloids are incorporated to maintain the monomer in finely-divided suspension throughout the aqueous phase. Additionally, compounds are employed, as needed, to serve as buffers to maintain the reaction mixture at the proper degree of acidity or alkalinity. The free-radical catalysts which have been typically employed in the art heretofore are monomer-soluble organic compounds such as organic peroxides, hydroperoxides, peroxy esters and azo nitriles, with the organic peroxides, e.g., lauroyl peroxide, benzoyl peroxide, di-tert-butyl peroxide, dicumyl peroxide and the like being especially preferred.

In the practice of this invention, it has been found that grafting of PVC polymers prepared in aqueous suspension with the aforementioned organic peroxide catalysts does not consistently provide copolymer products having both the desired processing properties and performance. The desired graft copolymer products are obtained when the PVC backbone polymer is prepared employing a combination of two specific organic peroxide compounds, namely, lauroyl peroxide and t-butyl peroxypivalate.

With the exception of the particular catalyst system used, the preparation of the PVC backbone polymer is effected in an aqueous suspension polymerization process as conventionally practiced. The water-to-monomer ratio generally may be varied from about 1.5 to 4:1, by weight, with a ratio of from 1.5 to 2.5:1 being typically employed. The suspending agent or protective colloid used may be either one or a mixture of various materials. Specific suitable suspending agents include methyl cellulose and its derivatives, e.g., methyl hydroxypropyl cellulose or carboxymethyl cellulose; any of the commercially available forms of gelatin, e.g., the so-called alkali-hydrolyzed, water-hydrolyzed and the acid-hydrolyzed gelatins; polyvinyl alcohol; polyvinyl pyrrolidone; or sodium alginate. Buffer compounds which are employed include, for example, sodium pyrophosphate, ammonium bicarbonate, ammonium hydroxide or disodium hydrogen phosphate. The polymerization process generally may be conducted at a temperature ranging from about 100° to 170° F. for a time period of from 5 to 20 hours. As typically practiced herein, however, the process is conducted at temperatures ranging from 105° to 155° F. for from 8 to 16 hours, which reaction conditions are preferred.

In general, the combined catalyst system is employed in a total amount ranging from 0.02 to 2 percent, based on the weight of vinyl chloride monomer. The preferred amount of total catalyst is within the range of 0.05 to 0.3 percent, based on the monomer weight. Of the total amount of catalyst used, from 0.5 to 2 parts, by weight, of lauroyl peroxide generally is employed for each part of t-butyl peroxypivalate. The presently preferred ratio of lauroyl peroxide to t-butyl peroxypivalate is 0.9 to 1.8:1 with a ratio of 1.10 to 1.2:1 being especially preferred.

When the polymerization reaction has been carried out to substantial completion (80–95% monomer conversion), the polymer product is isolated from the polymerization mixture and is dried. Thus, the PVC backbone polymer when grafted in the process of this invention is utilized in different form from PVC polymers utilized in prior art grafting techniques in that it is neither used in an "in situ" method nor is it utilized as a polymer "wet cake." As will be shown hereinafter by specific comparative examples, it has been found that for the successful practice of this invention, i.e., the production of the desired graft copolymer product, the PVC backbone polymer employed necessarily must be separated from the polymerization reaction mixture and dried prior to being resuspended in water and grafted. Of course, this PVC polymer backbone likewise must also be prepared with the dual catalyst system previously described.

The grafting reaction is conducted likewise in aqueous suspension by contacting the suspended PVC polymer with the methyl methacrylate monomer in the presence of one or more free-radical generating compounds as catalyst. Specifically, this process involves first suspending the dried PVC in water in an agitated reactor, employing generally a water-to-polymer ratio, by weight, of from 1 to 4:1, preferably a ratio of from about 1.5 to 3:1. After evacuation of the reactor, the methyl methacrylate, in an amount ranging up to about 6% based on the weight of the PVC, is introduced into the system along with the polymerization catalyst. While maintaining an inert atmosphere in the system, the reaction mixture is then heated to a temperature ranging from about 140° to 190° F. and is held at this temperature for a time period of 3 to 6 hours. The specific reaction temperature and time will depend on the type of catalyst and catalyst concentration utilized. The grafting reaction typically is carried out at a temperature ranging from 160° to 185° F. for a time period of from 3½ to 5 hours, which reaction conditions are presently preferred. In the reaction, methyl methacrylate conversion ranges between 80 to 95% efficiency.

The choice of free-radical catalyst incorporated to accelerate the grafting reaction is not especially critical and any one of the aforementioned organic peroxides or other monomer-soluble peroxy compuonds may be effectively employed. In practice, lauroyl peroxide and benzoyl peroxide have been found particularly suitable at present, with benzoyl peroxide being especially preferred. It has also been found advantageous to incorporate in the reaction mixture a water-soluble compound, e.g., sodium metabisulfite. This type compound serves to scavenge traces of oxygen left entrained in the mixture and helps to speed up the grafting reaction. The amount of catalyst and water-soluble compound which generally may be employed each ranges from 0.05 to 1.5 percent, based on the weight of methyl methacrylate monomer. However, the preferred amounts of these compounds range from 0.1 to 1 percent, based on the methyl methacrylate weight.

Depending upon the concentration of methyl methacrylate utilized in the grafting reaction, which amount may constitute up to about 6%, based on the weight of the PVC polymer, the copolymer products obtained will contain up to about 5.5%, by weight of polymethyl methacrylate grafted onto the PVC backbone.

These copolymer products exhibit improved processing characteristics by comparison to unmodified PVC. They likewise exhibit processing characteristics equivalent to those observed for blends of PVC with various commercially available copolymer products which are presently used in the industry as processing aids for PVC.

As prepared, the copolymer products of this invention are useful for fabricating high-quality rigid pipe, rods, films, foils, sheets and various other plastic articles by conventional extrusion, molding or calendering operations, said articles possessing good impact strength and good resistance to heat deformation. Prior to processing, the copolymers are typically blended with various compounding additives such as heat and light stabilizers, impact modifiers, lubricants, fillers and pigments, which ingredients have long been used in the compounding of rigid PVC formulations. It should be noted that the copolymer products of this invention can be processed alone and need not be blended with PVC homopolymer or other compatible resins in order to prepare finished articles of commercially-acceptable quality. However, it is to be understood that these copolymers may be employed in blends with PVC homopolymer, without departing from the scope of this invention.

In order that those skilled in the art may more completely understand the present invention and the preferred methods by which the same may be carried into effect, the following specific examples are offered. In these examples and elsewhere herein, if proportions of ingredients are expressed in parts, such proportions are by weight.

EXAMPLE 1

(A) Preparation of the PVC backbone polymer

A polyvinyl chloride homopolymer is prepared in aqueous suspension from the following formulation:

$H_2O$—1480 gal.
Vinyl chloride—740 gal.
Lauroyl peroxide—2 lbs.
T-butyl peroxypivalate—1 lb., 13 oz.
Gelatin—5 lbs., 12 oz.
Methyl cellulose (added as 5% solution in $H_2O$)—2 lbs., 2 oz.
Ammonium bicarbonate—1 lb., 11 oz.
Ammonium hydroxide—220 ml.

A glass-lined, 2000-gallon polymerization reactor fitted with an agitator is charged successively with the water, the methyl cellulose and gelatin solution, ammonium bicarbonate, ammonium hydroxide and the catalysts. The reactor is then purged with vinyl chloride and sealed, after which the vinyl chloride polymerization charge is added. The temperature of the reaction mixture is raised to 133° F., and the polymerization is continued for 13 hours. The reactor is then cooled and vented and the contents are discharged. The product is isolated, washed with water and dried. The finished homopolymer has a specific viscosity of 1.30, determined at 30° C., using a 1% solution of the polymer in cyclohexanone.

(B) Grafting of methyl methacrylate onto the PVC backbone

Employing the same agitated reactor as in A above, 5000 pounds of the PVC resin prepared is slurried in 1138 gallons of water. The reactor is then closed and evacuated for 30 minutes at ambient temperature, after which 275 pounds of methyl methacrylate monomer containing 2 lbs., 11 oz. of dissolved benzoyl peroxide is transferred into the reactor with vacuum. A solution of 2 lbs., 11 oz. of sodium metabisulfite (about 20 weight percent) in water is then transferred into the reactor likewise with vacuum. The reactor is then brought to atmospheric pressure with nitrogen, the reaction mixture is raised to a temperature of 185° F. and held at this temperature for 4½ hours. At the end of this time period, the reactor is cooled, the reaction mixture is discharged and centrifuged and the isolated graft copolymer product is water-washed and dried. The percentage of grafted polymethyl methacrylate in the finished copolymer is found by infrared spectrographic analysis to be 4.66%, by weight. The specific viscosity of this product, determined as described previously, is 1.28.

(C) Processing of vinyl chloride-methyl methacrylate graft copolymer

A rigid PVC resin composition incorporating the vinyl chloride-methyl methacrylate graft copolymer is prepared in a high-shear mixer equipped with high speed agitation means. For each 100 parts of copolymer in the formulation, the following compounding ingredients are empolyed in the proportions given:

| | Parts |
|---|---|
| Organotin mercaptide stabilizer | 2 |
| Titanium dioxide | 1 |
| Carbon black | 0.075 |
| High melting paraffin wax [1] | 0.8 |
| Calcium stearate | 2 |

[1] Aristowax—Lanier Company.

The ingredients are added to the copolymer in the mixer successively in the order listed. When the blended powder mixture reaches a temperature of 250° F., it is discharged and cooled to about 100° F. prior to use.

The prepared composition is then employed to produce 1-inch Schedule 40 pipe. It is processed by gravity-feed in a 2½-inch vented Prodex Extruder (24:1 $L/D$ ratio), using a single-stage screw having an over-all compression ratio of 3:1 and operated at 48 r.p.m. The heating zones of the extruder are maintained at 350°, 365°, 340° and 370° F., respectively. The composition processes at a rate of 83 pounds per hour. The finished pipe has a smooth and glossy surface, both inside and out, with no surface irregularities nor inner rings or die marks.

EXAMPLE 2

To illustrate the comparative performance of the graft copolymer of this invention to modified rigid PVC compositions of the prior art, a rigid resin powder composition is prepared with the same proportion of ingredients as described in Example 1—part C above. In this composition, a PVC homopolymer having a specific viscosity of 1.35 is substituted for the graft copolymer product of the invention. Additionally, 5 parts of a methyl methacrylate-ethyl acrylate copolymer (such as Acryloid K-120-N, manufactured by Rohm and Haas) is blended into the composition as processing aid for the PVC. The composition is discharged from the mixer when it attains a temperature of 250° F.

This PVC homopolymer composition is processed to make Schedule 40 pipe under the same extrusion conditions as employed for the composition containing the graft copolymer. This composition extrudes at a rate of 82 pounds per hour. The pipe product obtained is of similar quality to the pipe produced from the graft copolymer.

The results of Examples 1 and 2 indicate that the graft copolymer product of this invention may be processed as efficiently as PVC homopolymer resins modified with a resinous processing aid according to prior art methods to provide rigid plastic articles of acceptable quality and appearance.

EXAMPLE 3

A PVC backbone polymer is prepared in aqueous suspension, employing the same polymerization recipe and general procedure as outlined in Example 1, Part A. In this example, however, the lauroyl peroxide catalyst is omitted and the quantity of t-butyl peroxy pivalate used is 5 pounds.

The grafting reaction is then carried out in a 50-gallon, glass-lined polymerization reactor equipped with an agitator, by slurrying therein 100 pounds of the prepared PVC resin in 23 gallons of water. The reactor is then closed, evacuated for 30 minutes at ambient temperature, after which 5 pounds of methyl methacrylate monomer containing 45.4 g. of dissolved benzoyl peroxide is transferred into the reactor with vacuum. An aqueous solution (about 20 weight percent) of sodium methabisulfite is added to the reactor with vacuum. A slightly positive nitrogen pressure is effected in the system, the reaction mixture is then heated to 185° F. and held at this temperature for 4½ hours. The reactor is then cooled, and the graft copolymer product is isolated, washed and dried as previously described. The percentage of grafted polymethyl methacrylate in the finished copolymer is found by analysis to be 4.25%, by weight.

The copolymer is formulated in a rigid powder composition as set forth in Example 1, Part C. The prepared composition is then empolyed to produce 1-inch Schedule 40 pipe in the 2½-inch extruder under the same processing conditions as described in the example. The finished pipe is of unacceptable commercial quality because of a rough, irregular and dull outer surface.

EXAMPLE 4

In this example, a PVC backbone polymer is prepared as described in Example 1, Part A, employing the same polymerization recipe except that no t-butyl peroxy pivalate catalyst is included and the quantity of lauroyl peroxide used is increased to 10 pounds.

In a 500-gallon, glass-lined reactor, 1000 pounds of the finished, dried PVC resin product is reslurried in water (1.8:1 water to resin ratio) and grafted with methyl methacrylate monomer as described in Example 1, Part B. Fifty-five pounds of the monomer containing 227 g. of dissolved benzoyl peroxide is employed along with a solution of 2.7 g. (20 weight percent) of sodium metabisulfite in water. The finished copolymer product contains 4.15% of grafted methyl methacrylate polymer, by weight.

A rigid resin powder composition incorporating this copolymer is prepared according to the formulation and procedure employed in the previous examples. The composition likewise is fabricated into rigid pipe as previously described. The finished pipe exhibits a dull, irregular and grainy outer surface.

The unacceptable quality of the pipe products obtained from the graft copolymer products of the foregoing Examples 3 and 4 indicate that these copolymer products are inferior in processing characteristics by comparison to the vinyl chloride-methyl methacrylate graft copolymer product of this invention. This inferior processing performance is believed to be due to the fact that the copolymer products of Examples 3 and 4 are prepared from PVC backbone polymers which are polymerized according to prior art methods which utilize only a single free-radical catalyst.

EXAMPLES 5–7

Graft copolymers of polymethyl methacrylate on PVC backbone polymer are prepared by "in situ" method, i.e., a process wherein the backbone polymer and the graft copolymer thereof are prepared successively in the same reactor without isolating or drying the prepared PVC backbone polymer prior to the grafting reaction. Also, different catalyst systems are employed in these examples to prepare the PVC backbone polymer. For these runs, a glass-lined, 50-gallon reactor fitted with an agitator is employed, and the polymerization recipes are as follows:

| | Example | | |
|---|---|---|---|
| | 5 | 6 | 7 |
| Water, gal. | 25 | 25 | 26 |
| Vinyl chloride, lbs. | 108 | 108 | 108 |
| Lauroyl peroxide, g. | 60 | | 110 |
| T-butyl peroxypivalate, g. | 37 | 80 | |
| Gelatin, g. | 50 | 50 | 50 |
| Methyl Cellulose, g. (as 5% solution, in water) | 36 | 33 | 40 |
| Ammonium bicarbonate, g. | 15 | 15 | 15 |
| Ammonium hydroxide, ml. | 4.1 | 4.1 | 4.1 |

For each run, the reactor is charged and the polymerization carried out as described in Example 1. After the reaction has reached the desired conversion, the reactor is cooled and vented but the reactin mixture is not discharged. The reactor is then evacuated for 30 minutes at ambient temperature, after which 6 pounds of methyl methacrylate monomer containing 27.3 g. of dissolved benzoyl peroxide is transferred into the reactor with vacuum. A solution of 27.3 g. of sodium metabisulfite in water is similarly added to the reactor. The reaction mixture is then heated to 185° F. and maintained at this temperature for 4 hours, after which the copolymer product is isolated and dried as previously described. The finished copolymer products from Examples 5, 6 and 7 contain, by weight, 4.5, 4.4 and 4.6% of grafted polymethyl methacrylate, respectively.

Each of the finished copolymers is formulated into a rigid resin powder composition as described in Example 1, Part C. The prepared compositions are then processed into rigid pipe as previously described. The finished pipe product from each copolymer composition is of commercially-unacceptable quality, exhibiting an irregular, rough outer surface with a dull and grainy appearance. Additionally, the composition prepared from the copolymer product of Example 6 cakes up in the hopper section of the extruder and does not feed properly.

The poor-quality pipe prducts fabricated from the copolymers of these examples indicate that an "in situ" method for grafting methyl methacrylate monomer onto a PVC backbone polymer in an aqueous suspension system does not provide graft copolymers having the excellent quality of the copolymer product of this invention.

EXAMPLE 8

To determine the quality of a methyl methacrylate-vinyl chloride graft copolymer which is prepared from a PVC backbone polymer employed as a polymer "wet cake" in the grafting reaction, a PVC resin is prepared in aqueous suspension in a glass-lined, 500-gallon reactor from the following polymerization recipe:

Water—350 gal.
Vinyl chloride—186 gal.
Lauroyl peroxide—1 lb., 8 oz.
T-butyl peroxypivalate—13 oz.
Gelatin—1 lb., 7¼ oz.
Methyl cellulose (added as 5% solution)—1 lb., 8 oz.
Ammonium bicarbonate—7 oz.
Ammonium hydroxide—55 ml.

The polymerization is conducted as described in Example 1, Part A. After completion of the reaction, the product is discharged and centrifuged to a polymer cake containing 20 to 30% moisture.

For the grafting reaction, 127 pounds of this PVC "wet cake" is reslurried in 20 gallons of water. After evacuation of the reactor, 5.5 pounds of methyl methacrylate containing 22.7 g. of dissolved benzoyl peroxide is transferred into the reactor with vacuum, followed by a solution of 22.7 g. (20 weight percent) of sodium metabisulfite in water. The reaction is then completed as in Example 1, Part B, and the finished copolymer contains 4.7% of grafted polymethyl methacrylate by weight.

When this copolymer product is formulated and processed into rigid pipe as described in the foregoing examples, it extrudes at a rate similar to the graft copolymer product of this invention, However, the finished pipe prepared therefrom is of commercially-unacceptable quality, exhibiting a very rough, irregular outer surface with a dull and grainy appearance.

It is to be understood that although the invention has been described with specific reference to particular embodiments thereof, it is not to be so limited, since changes and alterations therein may be made which are within the full intended scope of this invention as defined by the appended claims.

I claim:
1. In a method for preparing graft copolymers of polymethyl methacrylate on a polyvinyl chloride backbone polymer wherein a polyvinyl chloride resin suspended in an aqueous medium is contacted with methyl methacrylate monomer in the presence of a free-radi- cal generating compound, the improvement which comprises employing a polyvinyl chloride resin which has been prepared in aqueous suspension utilizing as the monomer-soluble polymerization catalyst, a mixture of lauroyl peroxide and t-butyl peroxypivalate, and has been subsequently dried, whereby the graft copolymer product obtained consistently exhibits improved processing characteristics and performance by comparison to vinyl chloride-methyl methacrylate graft copolymers which are produced from polyvinyl chloride backbone polymer prepared in polymerization systems employing single monomer-soluble organic peroxy compounds.

2. The method of claim 1 in which the preparation of the polyvinyl chloride backbone polymer is carried out at a temperature ranging from 100° F. to 170° F. for a time period of from 5 hours to 20 hours, employing a total catalyst concentration based on the weight of vinyl chloride monomer, of from 0.02 to 2 percent.

3. The method of claim 2 in which the catalysts are employed in a ratio of lauroyl peroxide to t-butyl peroxypivalate of 0.5 to 2:1.

4. The method of claim 1 which is carried out at a temperature ranging from 105° F. to 155° F. for from 8 to 16 hours, employing a total catalyst concentration of from 0.05 to 0.3 percent, based on the weight of the vinyl chloride monomer.

5. The method of claim 4 in which the catalysts are employed in a ratio of lauroyl peroxide to t-butyl peroxypivalate of 0.9 to 1.8:1.

6. A method for preparing a graft copolymer containing up to 5.5 percent, based on the weight of said copolymer, of polymethyl methacrylate grafted onto a polyvinyl chloride polymer backbone, which method comprises first suspending in an aqueous medium, a polyvinyl chloride suspension polymer which has been produced employing a mixture of lauroyl peroxide and t-butyl peroxypivalate as polymerization catalyst and has been subsequently dried, then contacting said suspended polyvinyl chloride polymer with up to 6 percent, based on weight of said polymer, of methyl methacrylate monomer and a monomer-soluble free-radical generating compound to promote grafting, heating said polyvinyl chloride-methyl methacrylate mixture at a temperature ranging from 140° F. to 190° F. for 3 to 6 hours; and finally recovering a copolymer containing up to 5.5 percent of polymethyl methacrylate, based on the weight of copolymer.

7. The method of claim 6 in which the monomer-soluble, free-radical generating compound is employed in an amount ranging from 0.05 to 1.5 percent, based on the weight of the methyl methacrylate monomer.

8. The method of claim 6 in which the free-radical generating compound is lauroyl peroxide or benzoyl peroxide.

9. The method of claim 6 in which a water-soluble compound is employed in addition to the monomer-soluble free radical catalyst to scavenge traces of oxygen entrained in the reaction mixture and accelerate the grafting reaction.

10. The method of claim 9 in which the water-soluble compound is sodium metabisulfite employed in an amount ranging from 0.05 to 1.5 percent, based on the weight of the methyl methacrylate monomer.

11. A copolymer containing up to 5.5 percent, by weight, of polymethyl methacrylate grafted onto a dried polyvinyl chloride backbone polymer which has been prepared in aqueous suspension, using a catalyst, a combination of lauroyl peroxide and t-butyl peroxypivalate, said copolymer being processed without processing aids into rigid plastic articles consistently of excellent quality.

References Cited

UNITED STATES PATENTS

Re. 257,634  4/1965  Marous et al. _____ 260—92.8

OTHER REFERENCES

Farber et al., Suspension Polymerization Kinetics of Vinyl Chloride, Polymer Eng. & Sci., January 1968, p. 11–18.

SAMUEL H. BLECH, Primary Examiner

J. SEIBERT, Assistant Examiner

U.S. Cl. X.R.

260—28.5, 29.6, 41, 92.8, 876